United States Patent [19]
Pottebaum

[11] Patent Number: 5,914,836
[45] Date of Patent: Jun. 22, 1999

[54] CANTILEVERED SUPPORT FOR THE MAGNETIC CIRCUIT OF A DISC DRIVE VOICE COIL MOTOR

[75] Inventor: Kenneth L. Pottebaum, Yukon, Okla.

[73] Assignee: Seagate Technology, Inc., Scotts Valley, Calif.

[21] Appl. No.: 08/829,350

[22] Filed: Mar. 31, 1997

[51] Int. Cl.⁶ ...................................................... G11B 5/54
[52] U.S. Cl. ........................................ 360/105; 360/97.01
[58] Field of Search ............................. 360/97.01–97.02, 360/104–106

[56] References Cited

U.S. PATENT DOCUMENTS

| | | |
|---|---|---|
| 5,136,439 | 8/1992 | Weispfenning et al. . |
| 5,262,907 | 11/1993 | Duffy et al. . |
| 5,416,658 | 5/1995 | Sega et al. ................................ 360/106 |
| 5,442,505 | 8/1995 | Forbord .................................... 360/106 |
| 5,452,159 | 9/1995 | Stefansky .................................. 360/105 |
| 5,475,545 | 12/1995 | Hampshire et al. . |
| 5,581,422 | 12/1996 | Umehara .................................. 360/106 |
| 5,585,981 | 12/1996 | Lee ........................................... 360/106 |
| 5,602,701 | 2/1997 | Komura et al. .......................... 360/106 |
| 5,650,895 | 7/1997 | Koizumi et al. ......................... 360/106 |
| 5,657,179 | 8/1997 | McKenzie ............................. 360/78.07 |

*Primary Examiner*—Brian E. Miller
*Attorney, Agent, or Firm*—Crowe & Dunlevy

[57] ABSTRACT

A support assembly for supporting a magnetic circuit of a disc drive voice coil motor, the support assembly suppressing the excitation of mechanical resonances in the drive. The disc drive includes a disc and an actuator assembly adjacent the disc, the actuator assembly having a coil of a voice coil motor to which current is applied in order to position a head of the actuator assembly relative to the surface of the disc. The voice coil motor further includes a magnetic circuit comprising a pair of permanent magnets and corresponding magnetically permeable pole pieces disposed above and below the coil. The support assembly suspends the magnetic circuit between a base deck and a top cover of the disc drive and allows cantilevered movement of the magnetic circuit in response to the acceleration of the coil as a result of current being applied to the coil.

19 Claims, 4 Drawing Sheets

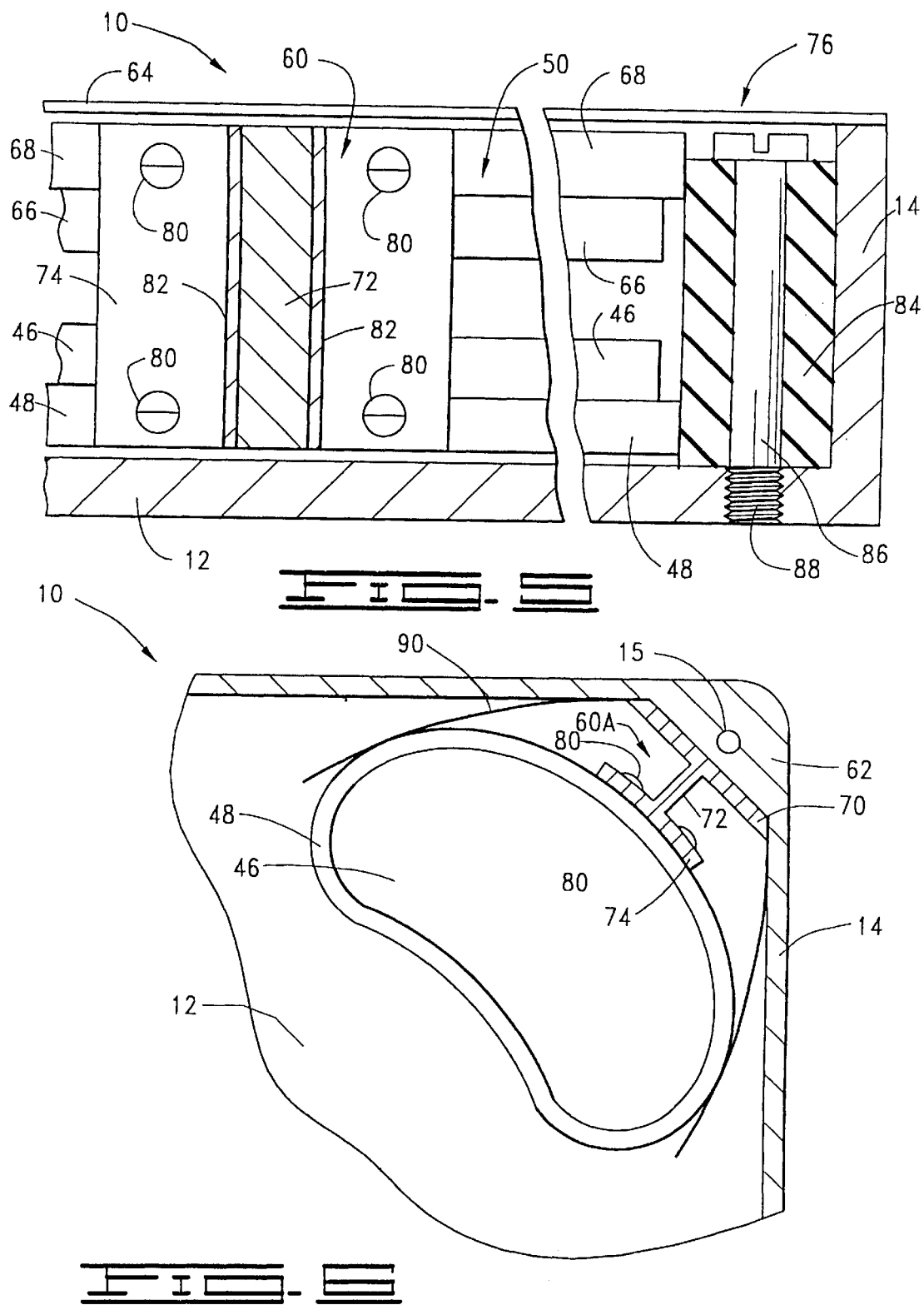

CANTILEVERED SUPPORT FOR THE MAGNETIC CIRCUIT OF A DISC DRIVE VOICE COIL MOTOR

FIELD OF THE INVENTION

This invention relates generally to the field of disc drive data storage devices, and more particularly, but not by way of limitation, to an apparatus for supporting the magnetic circuit of a disc drive voice coil motor to reduce the excitation of mechanical resonances in the drive.

BACKGROUND

Disc drives are commonly used in workstations, personal computers, laptops and other computer systems to store large amounts of data in a form that can be made readily available to a user. Such drives store and retrieve data using one or more magnetizable discs that are rotated at a constant high speed by a spindle motor. Each of the discs has a magnetizable surface coating that can be selectively magnetized by a corresponding read/write head so that the data is stored in the form of magnetic flux transitions along defined data tracks on the surface of the disc.

The heads are suspended over the discs and positionably controlled with respect to the tracks on the discs through the use of a rotary actuator assembly and a servo loop. The servo loop obtains position information from servo fields on the discs and, in response thereto, maintains the radial position of the heads through application of current to an actuator coil. The coil is part of a voice coil motor, which as will be recognized comprises one or more permanent magnets and corresponding pole pieces (magnetically permeable plates) which establish a magnetic field through which the coil moves; the magnetic interaction between the magnetic field of the permanent magnets and magnetic fields established in the coil as a result of the coil current causes the rotary actuator to position the heads as desired over the surfaces of the discs. For additional discussion regarding typical disc drive servo systems, see U.S. Pat. No. 5,262,907 issued Nov. 16, 1993 to Duffy et al. (dedicated servo system) and U.S. Pat. No. 5,136,439 issued Aug. 4, 1992 to Weispfenning et al. (embedded servo system). Both of these references are assigned to the assignee of the present invention.

As will be recognized, a disc drive seek operation comprises the controlled movement of a selected head from an initial track to a destination track. Typically, the velocity of the head during the seek is measured and controlled using a velocity control approach, so that a velocity profile for the head is established and used to adjust the amount of current applied to the coil in order to first accelerate and then decelerate the head towards the destination track. It is desirable to accomplish the seek in as short a time as possible in order to maximize data transfer rates between the disc drive and the host computer; however, the faster the seek, the greater the transitions in the amount of current that must be applied to the coil, which can lead to the undesirable excitation of mechanical resonances in the drive. As will be recognized, such excited resonances can lengthen the time required to settle the head onto the destination track and can also affect the ability of the servo loop to subsequently maintain the head over the destination track. Moreover, such excited resonances, if established in the disc drive base deck or top cover, can further lead to the generation of undesirable acoustic noise.

Efforts have been made in the prior art to minimize such effects, including the addition of acoustic noise dampening materials to the drive structure and the shaping of the velocity profile to minimize the excitation of mechanical resonances during initial portions of the acceleration and deceleration stages of a seek; for example see U.S. Pat. No. 5,475,545 issued Dec. 12, 1995 to Hampshire et al., as well as U.S. Pat. No. 5,657,179 issued Aug. 12, 1997 to McKenzie. Both of these references are assigned to the assignee of the present invention and incorporated herein by reference.

Whereas such prior art approaches have been effective in reducing the excitation of resonances and the generation of acoustic noise, there is a continual need for further improvements to meet the continued demand for drives with ever increasing data storage and transfer rate capacities and ever improving performance characteristics.

SUMMARY OF THE INVENTION

The present invention comprises a support assembly for providing support of a magnetic circuit of a disc drive voice coil motor, the support assembly suppressing the excitation of mechanical resonances in the drive.

More particularly, in the preferred embodiment the disc drive includes a disc and an actuator assembly adjacent the disc, the actuator assembly having a coil of a voice coil motor to which current is applied in order to position a head of the actuator assembly relative to the surface of the disc. The voice coil motor further includes a magnetic circuit preferably comprising a pair of permanent magnets and corresponding magnetically permeable pole pieces disposed above and below the coil, so that the interaction between the magnetic fields generated by the coil and the magnetic circuit causes the coil to move relative to the magnetic circuit.

The support assembly suspends the magnetic circuit between a base deck and a top cover of the disc drive and allows cantilevered movement of the magnetic circuit in response to the acceleration of the coil as a result of current being applied thereto. That is, a gap is established between the magnetic circuit and a base deck to which the actuator assembly is mounted, and a second gap is established between the magnetic circuit and a top cover of the disc drive; the magnetic circuit is thus isolated from the base deck and top cover and allowed to cantilever with respect to the same. The support assembly includes a base deck attachment plate which is rigidly affixed to the base deck, a support arm extending from the base deck attachment plate and a magnetic circuit attachment plate which is affixed to the pole pieces of the magnetic circuit.

The support arm is preferably characterized as a spring so as to facilitate the cantilevered movement of the magnetic circuit. Additional damping layers in the form of thin sheets of a compliant material, such as aluminum, are provided to the support arm in order to provide constraint layer damping.

Centering mechanisms, such as dampers or springs, can further be disposed adjacent to the magnetic circuit and used to limit the movement of the magnetic circuit as well as to tend to force the magnetic circuit back to its centered position.

These and various other features as well as advantages which characterize the present invention will be apparent from a reading of the following detailed description and a review of the associated drawings.

BRIEF DESCRIPTION OF THE DRAWINGS

FIG. 4 also illustrates in greater detail the use of constraint layer damping in accordance with the present invention.

FIG. 5 provides an elevational view of the magnetic circuit support assembly and magnetic circuit as shown from line 5—5 of FIG. 4, and includes a damper used to limit the cantilevered movement of the magnetic circuit.

FIG. 6 provides a top plan view of another embodiment for the magnetic circuit support assembly, comprising the use of leaf-springs to limit the cantilevered movement of the magnetic circuit.

DETAILED DESCRIPTION

Figure 1:
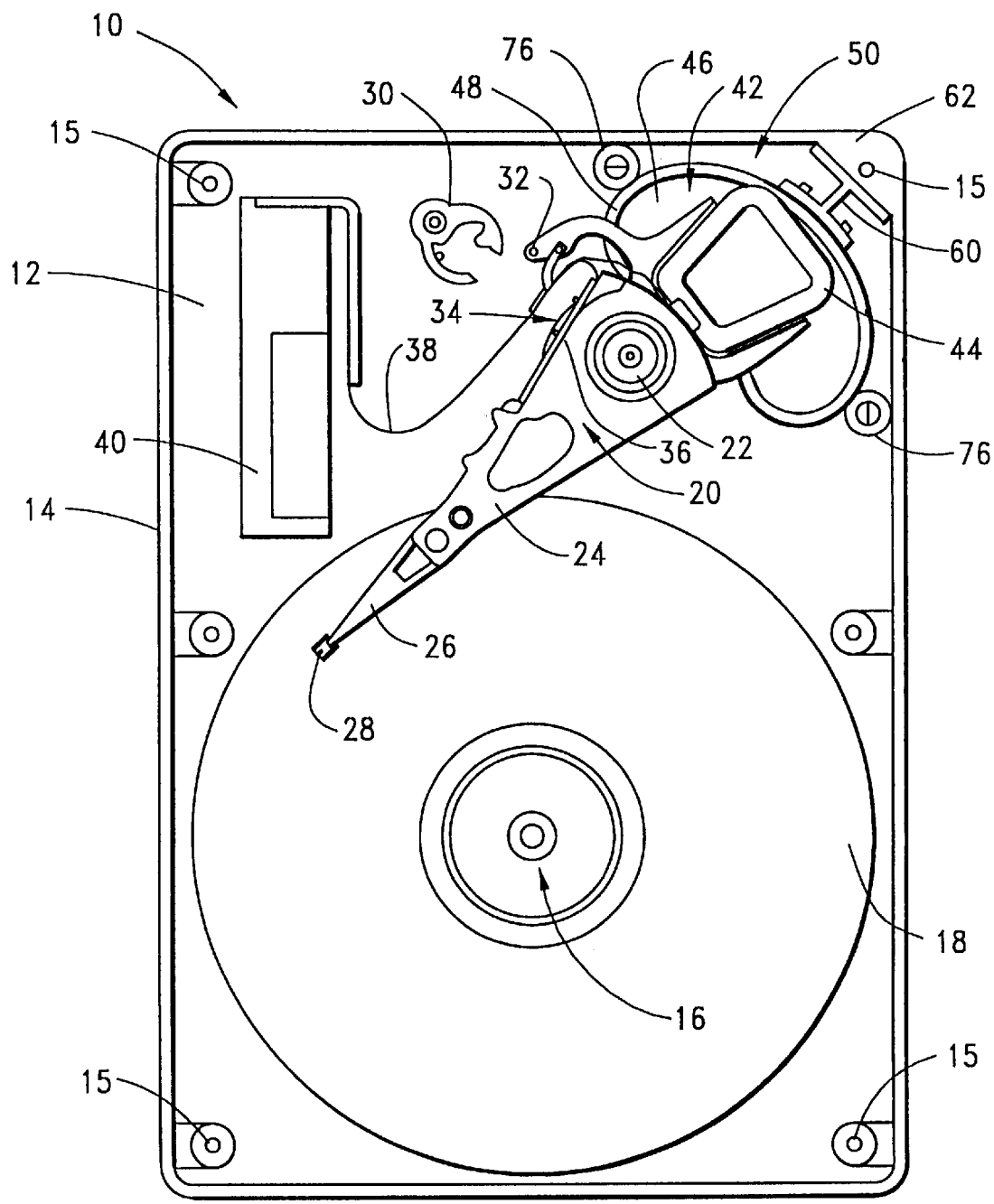
FIG. 1 is a top plan view of a magnetic circuit support assembly in a disc drive constructed in accordance with the preferred embodiment of the present invention.

Turning now to the drawings and more particularly to FIG. 1, shown therein is a top plan view of a disc drive 10 constructed in accordance with the present invention. The disc drive 10 includes a base deck 12 to which various disc drive components are mounted and side walls 14 which, in combination with a top cover (not shown), provide a sealed internal environment for the disc drive 10. Mounting holes 15 are provided to secure the top cover to the side walls 14 using suitable threaded fasteners (not shown).

A spindle motor (shown generally at 16) is supported by the base deck 12 and includes a hub (not designated) to which a plurality of discs 18 are mounted for rotation at a constant high speed. Adjacent the discs 18 is an actuator assembly 20 which pivots about a pivot bearing assembly 22 in a rotary fashion. The actuator assembly 20 includes actuator arms 24 which support gimbal assemblies 26. The gimbal assemblies 26 in turn support heads 28, with each of the heads 28 corresponding to a surface of one of the discs 18. As provided hereinabove, the heads 28 are positionably located over nominally concentric data tracks (not shown) of the discs 18 in order to read data from and write data to the tracks.

At such time that the disc drive 10 is not in use, the heads 28 are moved to landing zones (not designated) which are located near the inner diameter of the discs 18. A latch 30 engages a latch pin 32 in order to secure the actuator assembly 20 when the heads 28 are disposed over the landing zones.

To provide the requisite electrical conduction paths between the heads 28 and disc drive read/write circuitry (not shown), head wires are routed on the actuator assembly 20 from the heads 28, along the gimbal assemblies 26 and the actuator arms 24 to a flex circuit assembly 34. The head wires are secured to corresponding pads of a flex circuit board 36, which in turn is connected to a flex 38 which terminates at a flex circuit bracket 40 in a conventional manner to facilitate communication between the flex circuit assembly 34 and a printed circuit board (PCB) mounted to the underside of the disc drive 10. As will be recognized, the PCB houses the control electronics for the disc drive 10.

Continuing with FIG. 1, the actuator assembly 20 is controllably positioned by way of a voice coil motor (VCM, shown generally at 42) comprising an actuator coil 44 immersed in the magnetic field generated by a first permanent magnet 46. A first pole piece 48 supports the first permanent magnet 46, the first pole piece 48 comprising a magnetically permeable plate (such as steel) having a top surface to which the first permanent magnet is bonded in a conventional manner. Although not shown in FIG. 1, an additional magnet and pole piece are supported above and vertically align with the first permanent magnet 46 and the first pole piece 48. It will be recognized that a magnetic circuit 50 is thus formed from the permanent magnets and the corresponding pole pieces so that, when current is passed through the actuator coil 44, an electromagnetic field is set up which interacts with the magnetic circuit 50 to cause the actuator coil 44 to move in accordance with the well-known Lorentz relationship. As the actuator coil 44 moves, the actuator assembly 20 pivots about the pivot bearing assembly 22, causing the heads 28 to move across the surfaces of the discs 18.

Of particular interest in FIG. 1 is the manner in which the magnetic circuit 50 of the VCM 42 is supported, said support being accomplished by a magnetic circuit support assembly 60 (hereinafter also referred to as a "support assembly"). As described in greater detail below, the support assembly 60 is preferably attached to a corner portion 62 of the side walls 14 of the base deck 12 and provides complete mechanical support for the magnetic circuit 50, unlike the prior art wherein support for the magnetic circuitry is provided by the base deck and the top cover, such as through the attachment of the pole pieces to the base deck and top cover using suitable fasteners.

Figure 2:
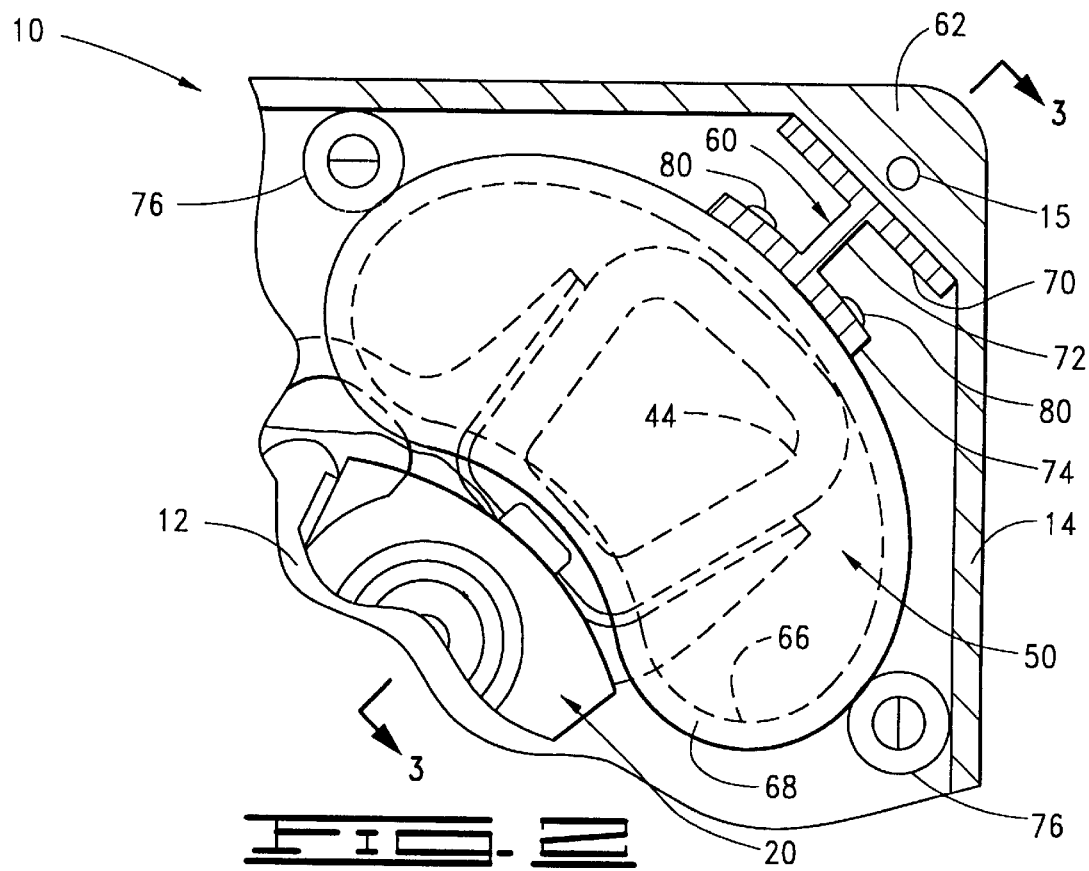
FIG. 2 shows a portion of the disc drive of FIG. 1, illustrating in greater detail the magnetic circuit support assembly of FIG. 1.
Figure 3:
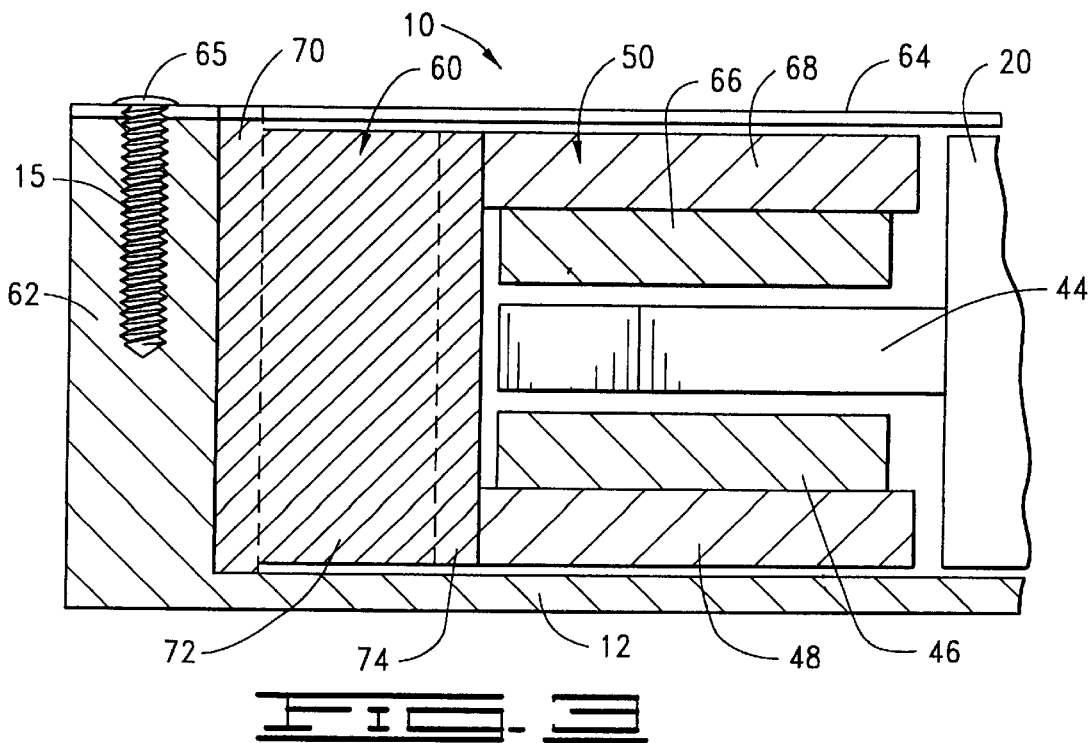
FIG. 3 provides a cross-sectional, elevational view of the magnetic circuit support assembly along line 3—3 of FIG. 2, with some additional components not shown in FIGS. 1 and 2 in order to illustrate the various relationships between the disc drive base deck, top cover, actuator assembly, magnetic circuit and the magnetic circuit support assembly.

With reference to FIGS. 2 and 3, shown therein is a portion of the disc drive 10 in greater detail. More particularly, FIG. 2 provides a top plan, partial cross-sectional view of the support assembly 60 and the magnetic circuit 50 of FIG. 1 and includes a second pole piece 68 not shown in FIG. 1. FIG. 3 generally provides a cross-sectional, side elevational view of FIG. 2 along line 3—3. To facilitate the present discussion, FIG. 3 has been provided with several additional components that are not shown in FIGS. 1 and 2, including a top cover 64 and an associated top cover fastener 65. A second permanent magnet 66 is also shown more fully in FIG. 3. It will thus be readily understood that the magnetic circuit 50 comprises the permanent magnets 46, 66 and the pole pieces 48, 68, although other magnetic circuit configurations, such as a single magnet and two pole pieces, are known in the art and can readily be used in the practice of the present invention. Moreover, both FIGS. 2 and 3 illustrate the relative spacing between the magnetic circuit 50, the support assembly 60 and the actuator assembly 20.

Continuing with FIG. 2, the support assembly 60 comprises a side wall attachment plate 70 which is secured to the corner portion 62 of the side walls 14 of the base deck 12 in a manner to be described below. Extending from the side wall attachment plate 70 in a direction towards the magnetic circuit 50 is a support arm 72, which is further attached to a pole piece attachment plate 74. Thus, as shown in FIGS. 2 and 3, the support assembly 60 is formed in a general I-beam fashion, with contours selected as required to mate with the corner portion 62 and the magnetic circuit 50. As will be recognized from FIG. 3, the side wall attachment plate 70 extends the entire vertical height of the interior portion of the disc drive 10 so that top and bottom surfaces (not designated) of the side wall attachment plate 70 contact the base deck 12 and the top cover 64; however, the support arm 72 and the pole piece attachment plate 74 have vertical extents which are less than the vertical height of the interior portion of the disc drive 10 so that the magnetic circuit 50 is suspended between the base deck 12 and the top cover 64. The pole piece attachment plate 74 is attached to the first and second pole pieces 48, 68 in a manner to be described below.

The mechanical support for the magnetic circuit 50 is thus wholly provided by the support assembly 60, serving to mechanically isolate the magnetic circuit 50 from the base deck 12 and the top cover 64. Moreover, the support arm 72 is further preferably characterized as a spring to facilitate relatively small reaction movement by the magnetic circuit 50 in response to acceleration and deceleration of the actuator coil 44 relative thereto. That is, the support assembly 60 allows the magnetic circuit 50 to deflect slightly (in a plane parallel to the plane of motion of the actuator coil 44) in response to large changes in coil velocity so that the excitation of mechanical resonances is further reduced or eliminated during movement of the actuator coil 44.

By way of illustration, at the beginning of a seek a relatively large current is applied to the actuator coil 44 in order to accelerate a selected head 18 (FIG. 1) from an initial track and towards a destination track. As a result of the application of this acceleration current, the actuator coil 44 "pushes off" from the magnetic circuit 50 and begins moving in the appropriate direction to cause the head 18 to begin accelerating towards the destination track. At the same time, the magnetic circuit 50 will tend to move in a direction opposite from the direction of motion of the actuator coil 44 as a result of the spring characteristics of the support arm 72. Due to the relative mass of the magnetic circuit 50 (which is about 10 times that of the mass of the actuator assembly 20) and due to the stiffness of the support arm 72, the actual deflection of the magnetic circuit 50 will be very small, but sufficient to absorb energy that could otherwise excite resonances in the system.

Because the actual movement of the magnetic circuit 50 will be minimal (and further restricted by the use of centering means to be discussed below), the actuator assembly 20 will still be able to accelerate as before without appreciable changes in performance, although it may be necessary to increase the amount of current applied to the actuator coil 44 in order to obtain the same rate of acceleration during the seek. Additionally, it is contemplated that servo control of the actuator assembly 20 can be performed as before with no changes to the servo loop, except for the need in some cases to adjust the servo loop gain slightly to account for the movement of the magnetic circuit 50; however, such modifications to the servo loop are well within the ability of those skilled in the art.

The support assembly 60 is preferably fabricated from a single extruded piece of metal such as brass, copper or aluminum, depending upon the requirements of a particular application. The cross sectional shape of the support arm 72 is selected in order to provide optimum support and flex characteristics. In the preferred embodiment, it is contemplated that the flexing of the magnetic circuit 50 will be somewhat non-linear, so that an ever increasing amount of deflection force is required in order to move the magnetic circuit 50 further away from its initial center position. This can be accomplished through the configuration of the support arm 72, in conjunction with additional centering means, such as springs or dampers disposed on each side of the magnetic circuit 50. Such centering means will be discussed in greater detail below, but for reference, dampers 76 for facilitating the centering of the magnetic circuit 50 have been shown in FIGS. 1 and 2.

Figure 4:
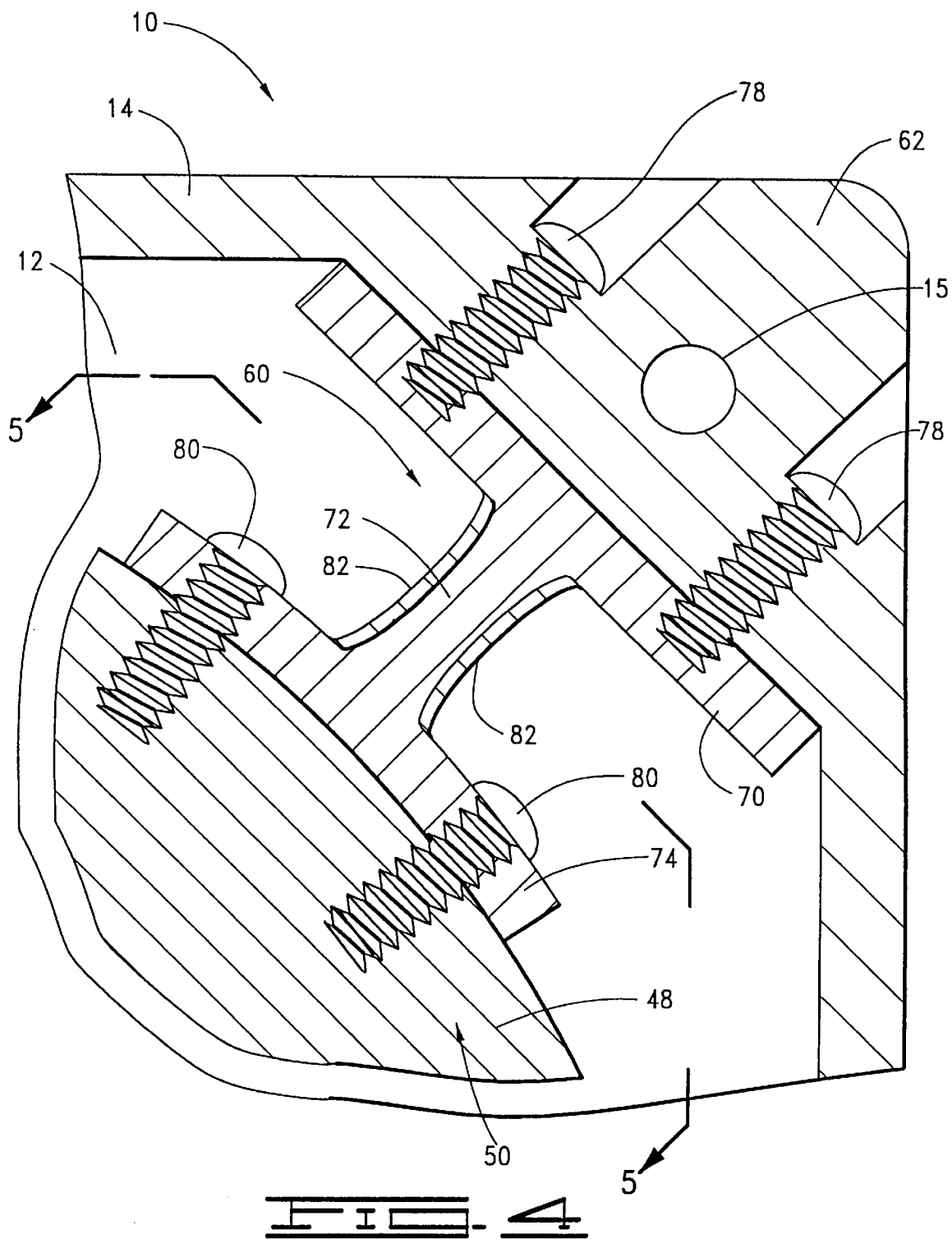
FIG. 4 provides a top plan view of the magnetic circuit support assembly, illustrating the attachment of the magnetic circuit support assembly to the disc drive base deck and to the magnetic circuit.

Referring now to FIG. 4, shown therein is another view of the support assembly 60, showing the preferred means of attachment of the support assembly 60 within the disc drive 10. More particularly, fasteners 78 are provided and screw through the corner portion 62 of the side walls 14 and into the side wall attachment plate 70 as shown. Additionally, fasteners 80 are similarly used to fasten the pole pieces 48, 68 to the pole piece attachment plate 74.

Continuing with FIG. 4, the support assembly 60 is further shown to comprise laminate layers 82 aligned along selected sides of the support arm 74, each of the laminate layers 82 preferably comprising a thin layer of material, such as a 0.002" thick layer of aluminum, which is bonded to the support arm 74 using a suitable adhesive. Thus, the adhesive acts as a compliant layer which is constrained by the associated laminate layer 82 and serves to dampen vibrations by facilitating relative movement between the laminate layers 82 and the support arm 72.

Referring now to FIG. 5, shown therein is another view of the magnetic circuit 50 and a portion of the support assembly 60, taken along line 5—5 of FIG. 4. As shown in FIG. 5, two sets of the fasteners 80 are used to secure the pole pieces 48, 68 to the pole piece attachment plate 74.

One of the dampers 76 of FIGS. 1 and 3 is set forth in greater detail in FIG. 5 and is shown to comprise a cylindrically shaped damping portion 84 which is secured to the base deck 12 by way of a shaft 86 having a threaded end 88 which engages with the base deck 12. The damping portion 84 can be any of a variety of materials having the requisite damping and non-particulating characteristics suitable for the interior of the disc drive 10, such as viton. The damper 76 is located and sized so as to compressed between the side wall 14 and the pole pieces 48, 68 as shown. Although the shaft 86 is shown in FIG. 5 to have a height less than the total height of the interior of the disc drive 10, alternatively the shaft 86 could be extended so that a suitable fastener (not shown) could be extended through the top cover 64 and into a top threaded hole in the shaft 86.

As described above, the damper 76 serves to oppose lateral movement of the magnetic circuit 50 due to the increased compression of the damping portion 84 at such time that the pole pieces 48, 68 are moved towards the damper 76. Moreover, because the damper 76 is initially compressed between the pole pieces 48, 68 and the side walls 14, additional dampening is provided during both seeks and track following modes of operation. The damper 76 further serves to prevent the magnetic circuit 50 from rocking or tipping during movement.

Referring now to FIG. 6, shown therein is a support assembly 60A which has an alternative configuration to the support assembly 60 of FIGS. 1–5. More particularly, the support assembly 60A is shown in FIG. 6 to further comprise a pair of leaf-springs 90 extending from the side wall attachment plate 70 and contacting the pole pieces 48, 68. Like the dampers 76, the springs 90 serve to oppose motion of the magnetic circuit 50 away from its center position. The springs 90 preferably comprise a thin layer of material formed during the same extrusion process used to form the rest of the support assembly 60A, although discrete spring assemblies are also contemplated.

Based upon the foregoing discussion, it will be apparent that the present invention provides significant advantages over the prior art. Although the cantilevered support of the magnetic circuit 50 has been described as being provided from the corner of the disc drive base deck 12, it will be recognized that other suitable configurations can be used as well. Similar results can also be obtained by supporting the magnetic circuit 50 so that it pivots about the same pivot axis as that of the actuator assembly 20; vertical height restrictions, however, might generally preclude such a configuration in a given disc drive design, as additional height would generally be necessary to accommodate support about this axis. In supporting the magnetic circuit 50 from the corner portion 62 of the side walls 14 as hereinabove described, it is not necessary that the pivot axis of the actuator assembly 20 be located at a point along a line defined by the support arm 72 of the support assembly 60, 60A; as shown in FIG. 1, the pivot bearing assembly 22 is not so aligned. However, it is desirable to center the support assembly 60, 60A relative to the magnetic circuit 50.

Accordingly, in summary the support assembly 60 suspends the magnetic circuit 50 above the disc drive base deck 12 and facilitates movement of the magnetic circuit 50 in response to the acceleration of the actuator coil 44 relative to the magnetic circuit 50 in order to suppress the excitation of mechanical resonances in the disc drive 10.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a disc and a rotary actuator assembly adjacent the disc, the disc rotated by a spindle motor assembly mounted to a disc drive base deck, the disc drive further comprising a voice coil motor for controllably positioning a head of the actuator assembly relative to a surface of the disc through the application of current to the voice coil motor by a servo circuit, the voice coil motor comprising a coil attached to the actuator assembly and a magnetic circuit comprising at least one permanent magnet and at least one pole piece, the disc drive further having a top cover which cooperates with the base deck to form a sealed internal environment for the disc drive, the improvement comprising:

a support arm supporting the magnetic circuit by suspending the magnetic circuit between the base deck and top cover so that the magnetic circuit is solely supported by the support arm, the support arm facilitating opposing cantilevered movement of the magnetic circuit relative to the base deck at such time that current is applied to the voice coil motor to position the head relative to the surface of the disc, the support arm flexing in response to torsion of the magnetic circuit.

2. The improvement as claimed in claim 1, wherein the support arm establishes a first gap between the base deck and the magnetic circuit, and wherein the support arm establishes a second gap between the top cover and the magnetic circuit.

3. The improvement as claimed in claim 1, wherein the improvement further comprises:

a base deck attachment plate attached to the base deck; and a magnetic circuit attachment plate attached to the magnetic circuit, wherein the support arm comprises a proximal end attached to the base deck attachment plate and a distal end attached to the magnetic circuit attachment plate, so that the support arm, the base deck attachment plate and the magnetic circuit attachment plate form a magnetic circuit support assembly characterized as comprising an I-beam configuration.

4. The improvement as claimed in claim 1, wherein the support arm further comprises:

a constraint layer; and a compliant layer disposed between the constraint layer and a selected portion of the support arm, the compliant layer and the constraint layer dampening vibrations established in the support arm.

5. The improvement as claimed in claim 3, wherein the base deck further comprises a side wall extending from the base deck in a direction substantially parallel to an axis of rotation of the disc, and wherein the base deck attachment plate is attached to the side wall.

6. The improvement as claimed in claim 1, further comprising:

centering means, adjacent the magnetic circuit, for providing a centering force upon the magnetic circuit to oppose and limit the cantilevered movement of the magnetic circuit.

7. The improvement as claimed in claim 6, wherein the centering means comprises a damper comprising a cylinder of dampening material disposed about a central shaft, the central shaft attached to the base deck.

8. The improvement as claimed in claim 6, wherein the centering means comprises a spring which provides the centering force between the magnetic circuit and the base deck.

9. A disc drive, comprising:

a base deck;

a spindle motor assembly mounted to the base deck;

a disc mounted to the spindle motor assembly for rotation by the spindle motor assembly about a disc axis, the disc including servo information defining a plurality of tracks on the disc;

an actuator assembly mounted to the base deck and rotatable about an actuator axis substantially parallel to the disc axis, the actuator assembly comprising:

a head disposed adjacent the disc; and an actuator coil disposed substantially opposite the head;

a servo control circuit, responsive to the head, for applying current to the actuator coil in response to the servo information on the disc;

a magnetic circuit comprising at least one magnetically permeable pole piece and at least one permanent magnet, the magnetic circuit disposed adjacent to the actuator coil and establishing a magnetic field which interacts with the actuator coil as current is provided to the actuator coil by the servo control circuit; and a support arm connected to the base deck and the magnetic circuit so that the magnetic circuit is solely supported above the base deck by the support arm, the support arm facilitating opposing cantilevered movement of the magnetic circuit relative to the base deck at such time that current is applied to the voice coil motor to position the head relative to the surface of the disc, the support arm flexing in response to torsion of the magnetic circuit.

10. The disc drive of claim 9, wherein the disc drive further comprises:

a base deck attachment plate attached to the base deck; and a magnetic circuit attachment plate attached to the magnetic circuit, wherein the support arm comprises a proximal end attached to the base deck attachment plate and a distal end attached to the magnetic circuit attachment plate, so that the support arm, the base deck attachment plate and the magnetic circuit attachment plate form a magnetic circuit support assembly characterized as comprising an I-beam configuration.

11. The disc drive of claim 9, wherein the support arm further comprises:

a constraint layer; and a compliant layer disposed between the constraint layer and a selected portion of the support arm, the compliant layer and the constraint layer dampening vibrations established in the support arm.

12. The disc drive of claim 10, wherein the base deck further comprises a side wall extending from the base deck in a direction substantially parallel to the disc axis, and wherein the base deck attachment plate is attached to the side wall.

13. The disc drive of claim 12, further comprising:

a spring disposed between the magnetic circuit and the side wall, the spring exerting a centering force upon the magnetic circuit to oppose and limit the cantilevered movement of the magnetic circuit.

14. The disc drive of claim 9, further comprising:

a damper disposed adjacent the magnetic circuit, the damper comprising a cylinder of dampening material disposed about a central shaft, the central shaft attached to the base deck, the damper providing a centering force upon the magnetic circuit to oppose and limit the cantilevered movement of the magnetic circuit.

15. A data storage device, comprising:

a rotatable data storage disc supported over a base deck;

a rotary actuator assembly supported by the base deck for controlled rotation about a pivot point adjacent the disc, comprising:

an arm extending away from the pivot point to support a head over a data surface of the disc; and a coil extending away from the pivot point opposite the arm;

a magnetic circuit supported over the base deck which establishes a magnetic field in which the coil is immersed the magnetic circuit comprising a permanent magnet and a pole piece; and a support arm supported by the base deck which facilitates opposing cantilevered movement of the magnetic circuit in response to application of current to the coil, the magnetic circuit solely supported by the support arm which flexes to facilitate the opposing cantilevered movement of the magnetic circuit.

16. The data storage device of claim 15, wherein the support further comprises:

a base deck attachment plate attached to the base deck; and a magnetic circuit attachment plate attached to the magnetic circuit, wherein the support arm comprises a proximal end attached to the base deck attachment plate and a distal end attached to the magnetic circuit attachment plate, so that the support arm, the base deck attachment plate and the magnetic circuit attachment plate form a support assembly characterized as comprising an I-beam configuration.

17. The data storage device of claim 15, wherein the support arm further comprises:

a constraint layer; and a compliant layer disposed between the constraint layer and a selected portion of the support arm, the compliant layer and the constraint layer dampening vibrations established in the support arm.

18. The data storage device of claim 15, wherein the base deck comprises a side wall, and wherein the data storage device further comprises:

a spring disposed between the magnetic circuit and the side wall which exerts a centering force upon the magnetic circuit to oppose and limit the cantilevered movement of the magnetic circuit.

19. The data storage device of claim 15, wherein the base deck comprises a side wall, and wherein the data storage device further comprises:

a damper disposed between the magnetic circuit and the side wall comprising a cylinder of dampening material disposed about a central shaft supported by the base deck and which exerts a centering force upon the magnetic circuit to oppose and limit the cantilevered movement of the magnetic circuit.

* * * * *